(12) United States Patent
Leimbach

(10) Patent No.: US 12,321,331 B2
(45) Date of Patent: Jun. 3, 2025

(54) SYSTEM B-TREE CHANGE NOTIFICATION SYSTEM USING LOCK VALUE BLOCKS

(71) Applicant: Dell Products L.P., Round Rock, TX (US)

(72) Inventor: David T. Leimbach, Mechanicsburg, PA (US)

(73) Assignee: DELL PRODUCTS L.P., Round Rock, TX (US)

( * ) Notice: Subject to any disclaimer, the term of this patent is extended or adjusted under 35 U.S.C. 154(b) by 105 days.

(21) Appl. No.: 17/812,472

(22) Filed: Jul. 14, 2022

(65) Prior Publication Data

US 2024/0020290 A1    Jan. 18, 2024

(51) Int. Cl.
*G06F 7/00* (2006.01)
*G06F 16/22* (2019.01)
*G06F 16/23* (2019.01)

(52) U.S. Cl.
CPC ...... *G06F 16/2343* (2019.01); *G06F 16/2246* (2019.01)

(58) Field of Classification Search
CPC ............ G06F 16/2343; G06F 16/2246; G06F 16/2255; G06F 16/27; G06F 16/211; G06F 16/219; H04L 67/1097; H04L 67/06
USPC ........ 707/704, 705, 797, 999.001, 696, 683, 707/783, 999.008, 999.003, 17.058
See application file for complete search history.

(56) References Cited

U.S. PATENT DOCUMENTS

| | | | |
|---|---|---|---|
| 11,334,293 B1 | 5/2022 | Leimbach et al. | |
| 2005/0289143 A1* | 12/2005 | Oshri | G06F 12/00 |
| 2014/0040199 A1* | 2/2014 | Golab | G06F 16/211 |
| | | | 707/634 |
| 2020/0250137 A1* | 8/2020 | Rajawat | H04L 67/1097 |

OTHER PUBLICATIONS

Digital Equipment Corporation, "Digital Technical Journal," No. 5 (Sep. 1987), p. 31, Publisher: Digital Equipment Corporation, Hudson, Massachusetts.

* cited by examiner

*Primary Examiner* — Md I Uddin
(74) *Attorney, Agent, or Firm* — Amin, Turocy & Watson, LLP

(57) ABSTRACT

Technology described herein is related to communication by a system B-Tree system using a lock system. An example method can comprise implementing, by a system comprising a processor, an exclusive lock in a lock domain that identifies a system B-tree (SBT) of an SBT system, updating, by the system, the SBT and incrementing, by the system, an SBT generation number associated with the SBT, and generating, by the system, a notification that requests verification of a change to the lock domain. Another example method can comprise applying a lock in a lock domain associated with a system B-Tree (SBT) of an SBT system, caching generation numbers associated with the lock domain, and verifying the generation numbers relative to one another to determine whether the generation numbers match one another.

20 Claims, 10 Drawing Sheets

FIG. 5

SYSTEM B-TREE CHANGE NOTIFICATION SYSTEM USING LOCK VALUE BLOCKS

BACKGROUND

Storage devices and/or systems can exist locally, in the cloud and/or as a hybrid model, relative to a customer/client. Control of data storage at these storage devices, such as server node systems, can be managed by one or more administrator devices that can employ one or more subsystems for work distribution.

SUMMARY

The following presents a simplified summary of the disclosed subject matter to provide a basic understanding of one or more of the various embodiments described herein. This summary is not an extensive overview of the various embodiments. It is intended neither to identify key or critical elements of the various embodiments nor to delineate the scope of the various embodiments. Its sole purpose is to present one or more concepts of the disclosure in a streamlined form as a prelude to the more detailed description that is presented later.

An example method can comprise method can comprise implementing, by a system comprising a processor, an exclusive lock in a lock domain that identifies a system B-tree (SBT) of an SBT system, updating, by the system, the SBT and incrementing, by the system, an SBT generation number associated with the SBT, and generating, by the system, a notification that requests verification of a change to the lock domain.

An example system can comprise a processor, and a memory that stores executable instructions that, when executed by the processor, facilitate performance of operations. The operations can comprise applying a lock in a lock domain associated with a system B-Tree (SBT) of an SBT system, caching generation numbers associated with the lock domain, and verifying the generation numbers relative to one another to determine whether the generation numbers match one another.

An example non-transitory computer-readable medium can comprise executable instructions that, when executed by a processor, can facilitate performance of operations. The operations can comprise applying a lock in a lock domain associated with a system B-Tree (SBT) of an SBT system, caching generation numbers associated with the lock domain, and verifying the generation numbers relative to one another to determine whether the generation numbers match one another.

An advantage of one or more of the above-indicated method, system and/or non-transitory computer-readable medium can be efficient communication of an administrator node with sub-nodes, such as a work distribution node with worker nodes. For example, as compared to conventional frameworks, the framework(s) discussed herein can employ less disc IO, less memory, less processing power and/or the like to communicate regarding changes to an SBT system.

Continuous polling of the SBT system, and/or of SBT space associated therewith, is not performed by the sub-nodes. Rather, the sub-nodes can rely on a steady state of the SBT space until receipt of a notification of a possible change to the SBT space.

In one or more embodiments of the above-indicated method, system and/or non-transitory computer-readable medium the notification can be due to a change relative to a lock of the lock domain that the administrator node and sub-nodes recognize as being used for SBT space communication. That change relative to a lock can comprise implementation of an exclusive lock, release of an exclusive lock, automatic release of a shared lock and/or implementation of a shared lock. Indeed, the one or more embodiments described herein can provide automatic indication of SBT generation number change via use of the notifications generating from the lock system. And thus, as indicated above, polling at a frequency by the sub-nodes is not employed, or can be employed at a low frequency.

BRIEF DESCRIPTION OF THE DRAWINGS

The technology described herein is illustrated by way of example and not limited in the accompanying figures in which like reference numerals indicate similar elements.

FIG. 5 illustrates a process flow diagram of one or more processes performed by the node system of any one or more of FIGS. 1-4, in accordance with one or more embodiments and/or implementations described herein.

DETAILED DESCRIPTION

Overview

Figure 1:
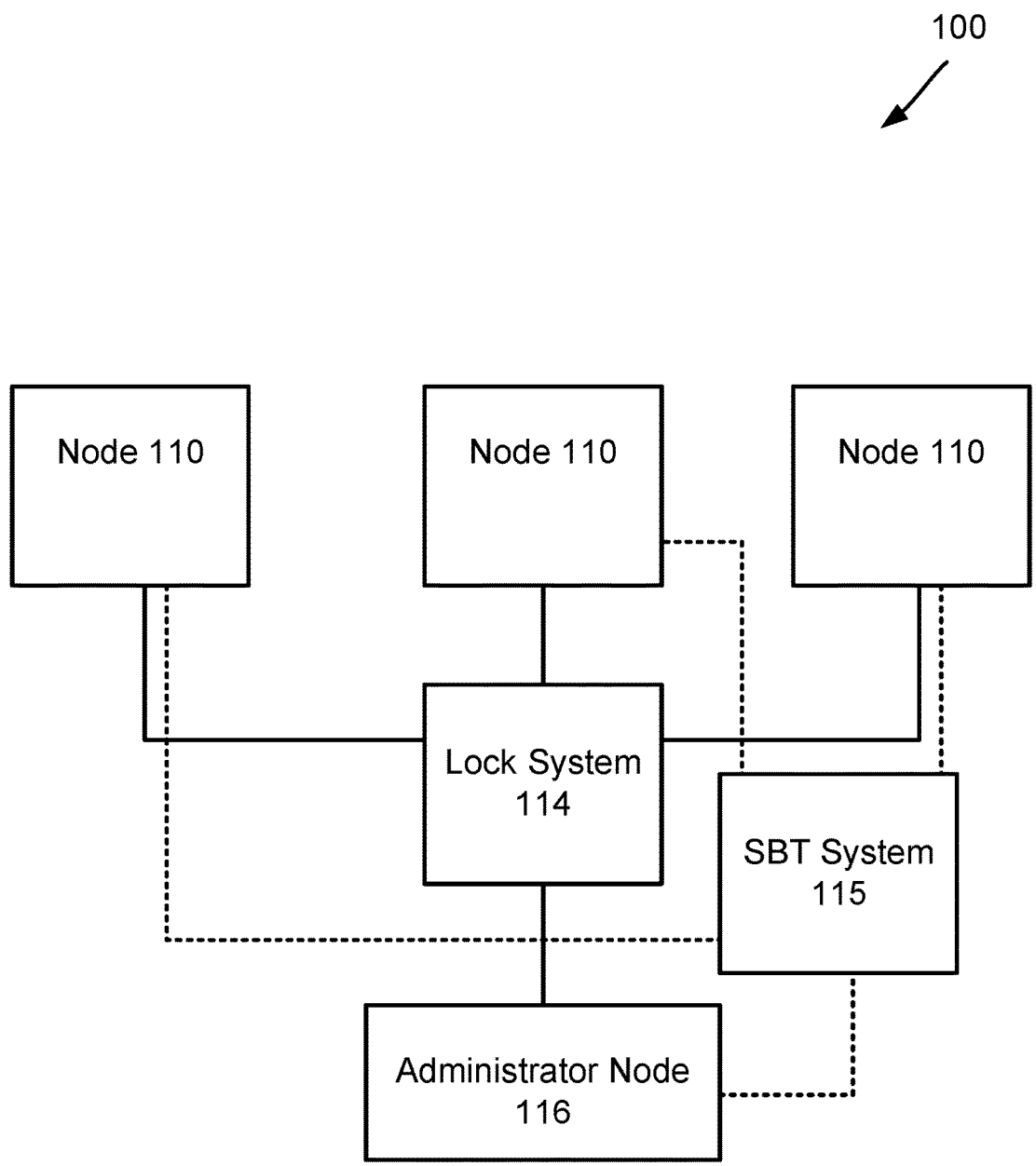
FIG. 1 illustrates a block diagram of a node system employing lock domain and a system B-Tree system, in accordance with one or more embodiments and/or implementations described herein.

The technology described herein is generally directed towards use of a shadow communication system, such as a lock domain or lock system, for communicating changes made to a system B-Tree (SBT) system. This can be an efficient process, different from frequency-based polling of an SBT space, to generate notification of changes to the SBT system.

In one example, the technology can be employed by an upper level node, administrator node, work distribution node, and/or the like to communicate with (e.g., send instructions, work orders, and/or the like) sub-nodes (e.g., worker nodes, lower level nodes, and/or the like). Less disc input/output (I/O), processing power, memory, power, and other cost can be employed to facilitate the communicating.

As used herein, a "node" can refer to a computer that can be part of a cluster. The cluster can be a group of nodes that can work cooperatively to implement a file system and/or other processes. Adding nodes to a cluster can provide a "scale out" mechanism for increasing an amount of CPU and RAM available to the cluster for any number of purposes. One or more nodes can comprise a drive that can provide additional storage to the cluster.

Nodes often can run same software (e.g., services) as all the others, but one node can be elected a "leader" of the cluster. That leader node (e.g., an administrator node) can create work for other nodes. A System B-Tree subsystem (SBT system) can be employed to facilitate the work assignments to the other nodes (e.g., the consumers). In one or more cases, work can be assigned to a particular node. In one or more other cases work can be assigned to more than one node. In one or more cases a work record can be created that is to be picked up by another consuming service on another node, or by another component on another system.

In one example, a key value storage space can be provided through such System B-Tree subsystem (SBT). SBTs can be efficient because they do not need to implement full file system semantics. SBTs, however, can lack events for change notification. To account for this deficiency, one or more embodiments described herein can provide a change notification system using a combination of a new lock domain employing lock value blocks, lock loss callbacks, and, in one or more embodiments, an event subsystem. As a result, reduction can be provided for an overall number of read requests to utilize SBTs for various applications by providing a node-local event stream to notify interested threads when it's time to look for changes in SBTs.

As used herein, a "user" can be a sub-node, node, worker node, customer, client, administrating entity and/or other entity.

Reference throughout this specification to "one embodiment," "an embodiment," "one implementation," "an implementation," etc. means that a particular feature, structure, or characteristic described in connection with the embodiment/implementation can be included in at least one embodiment/implementation. Thus, the appearances of such a phrase "in one embodiment," "in an implementation," etc. in various places throughout this specification are not necessarily all referring to the same embodiment/implementation. Furthermore, the particular features, structures, or characteristics may be combined in any suitable manner in one or more embodiments/implementations.

As used herein, with respect to any aforementioned and below mentioned uses, the term "in response to" can refer to any one or more states including, but not limited to: at the same time as, at least partially in parallel with, at least partially subsequent to and/or fully subsequent to, where suitable.

As used herein, the term "entity" can refer to a machine, device, smart device, component, hardware, software and/or human.

As used herein, the term "cost" can refer to power, money, memory, processing power and/or the like.

As used herein, the term "resource" can refer to power, money, memory, processing power and/or the like.

Example Architectures

Generally provided can be a generalized distributed lock management platform (LK) used for implementing correct file system semantics. This can include the ability to create new lock "domains" which can describe and implement different types of locks in a resource space. Those locks can carry additional value data when a lock is granted known as lock value blocks (LVB). Further, the lock domain can be configured to specify which lock types are compatible (can be taken by multiple owners simultaneously in the cluster), and which ones can grant the rights to either read or write LVBs.

Also provided can be a subsystem for fast key/value storage called "system b-trees" or SBTs. A single SBT contains a set of keys and associated values. An SBT can be iterated or searched using range queries across the key space. These SBTs can be used for configuration and/or statistical data as well as producer and/or consumer work queues.

LK can be a two-tiered locking system. Each node can coordinate cluster-wide resource lock ownership for a given resource within a lock domain. LK can have per-node initiators which work with coordinators to determine node-level lock ownership. Threads can be granted locks based on local node initiator ownership. When all of the threads on a given node unlock a resource, that lock can still be held at the initiator for efficiency reasons. This can be referred to as a "lazily held lock".

Also provided can be an event system. An event can provide an interface for subscribing to and receiving events at either cluster-wide or node-local scope. A widely used event producer/consumer of this system can be a gmp system which can inform key services when drives or nodes change states that require automatic and background level action, for re-protecting and balancing data for example.

Operationally, when a lock coordinator receives a request for a lock that is incompatible with existing held locks, it can communicate with the initiators that own incompatible locks to release them. If those locks are lazily held, the initiator can release the lock back to the coordinator. LK can provide an interface by which a node can trigger functions to run when a lock is released to the coordinator called a "lock loss callback". Lock loss callbacks can be used to inform other parts of the local node that an assumption guarded by the lock is now invalid, such as a cache. It is noted that a lock does not need to be held by any thread on the node to maintain a cache of data associated with such a lock.

By creating a new lock domain with resources that identify different SBTs, a global cached generation number (SBT generation number) for that SBT space can be generated and changes communicated via LVBs.

An SBT generation number can be similar to a version number or a counter. Each node can maintain a respective version of the state of the environment, per the last time the respective environment was read, as such version number. A node can execute a comparison of what was last read versus what is currently at the environment to establish a steady state. Thus the SBT generation number can serve as a cache invalidation mechanism, where the cache is valid as long as the SBT generation number remains the same.

The lock domain's compatibility table can be such that only one exclusive owner can exist at a time and that the exclusive owner is the only one allowed to update the associated LVB entry at a given time.

Indeed, by creating a lock domain with resources based on keys within a given SBT, threads can both subscribe to individual keys of interest and receive notifications similarly. The SBT needs a value structure in which the blobs associated with the keys contain the generation number for the key to be used as the above algorithms. By making a modification to the way consumers subscribe to events, framework discussed herein can change the granularity of a subscriber to individual SBT entries.

For example, relative to the SBT generation number, LVB generation number and lock system discussed above, a lock loss callback can provide an event and/or notification to one or more nodes to go back and re-read the SBT current generation number, employed as a LVB generation number, to determine if a change has been implemented for the SBT system.

With all of those components in place, the SBT generation number (which is the authoritative source of truth for the "version" of the SBT state), the Lock Value Block copy of it, which is used to establish the cache across all nodes in parallel with shared locks (as long as there is no exclusive locker holding an exclusive lock), and the ability to trigger lock loss callbacks when an exclusive locker updates the Lock Value Block (LVB) generation number can, in combination, provide a framework for a cache invalidation/change notification system, and can facilitate avoidance of polling the SBTs in order to keep the nodes up-to-date.

One or more embodiments are now described with reference to the drawings, where like referenced numerals are used to refer to like elements throughout. In the following description, for purposes of explanation, numerous specific details are set forth to provide a more thorough understanding of the one or more embodiments. It is evident, however, in various cases, that the one or more embodiments can be practiced without these specific details.

Further, the embodiments depicted in one or more figures described herein are for illustration only, and as such, the architecture of embodiments is not limited to the systems, devices and/or components depicted therein, nor to any particular order, connection and/or coupling of systems, devices and/or components depicted therein. For example, in one or more embodiments, the non-limiting system architectures described, and/or systems thereof, can further comprise one or more computer and/or computing-based elements described herein with reference to an operating environment, such as the operating environment 900 illustrated at FIG. 9. In one or more described embodiments, computer and/or computing-based elements can be used in connection with implementing one or more of the systems, devices, components and/or computer-implemented operations shown and/or described in connection with FIGS. 1-4 and/or with other figures described herein.

Turning first to FIG. 1, an exemplary node system, such as multi-node system 100, is illustrated that can employ a lock system 114 to communicate changes to a system B-Tree (SBT) system 115. The multi-node system 100 can comprise an administrator node 116 and a plurality of nodes 110. Each of the administrator node 116 and nodes 110 can be coupled to, and/or couplable too, such as for communication with, the lock system 114 and the SBT system 115. A connection can exist between the lock system 114 and the SBT system 115.

Figure 2:
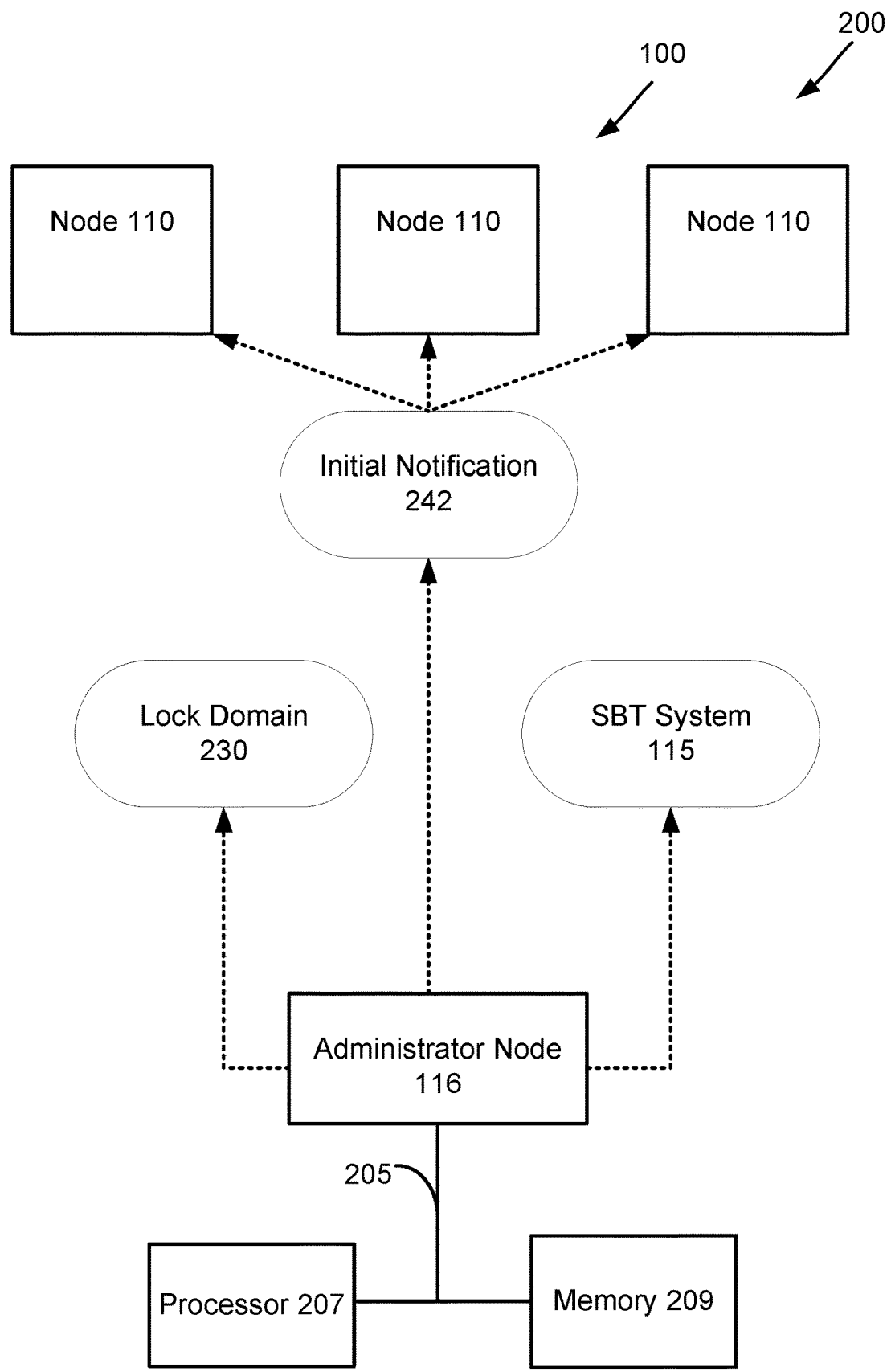
FIG. 2 illustrates another block diagram of a node system employing lock domain and a system B-Tree system, in accordance with one or more embodiments and/or implementations described herein.

Turning next to FIG. 2, a partial schematic 200 of the multi-node system 100 of FIG. 1 is depicted, illustrating aspects of the system relative to the administrator node 116. While referring here to one or more processes, operations, facilitations and/or uses of the non-limiting system 200, description provided herein, above and/or below also can be relevant to one or more other non-limiting system architectures described herein. Repetitive description of like elements and/or processes employed in respective embodiments is omitted for sake of brevity.

Generally, the multi-node system 100 can comprise any suitable computing devices, hardware, software, operating systems, drivers, network interfaces and/or so forth. For example, the administrator node 116 can be coupled to a suitable processor 207 and memory 209 by a bus 205.

Communication among between the illustrated nodes 110 and the lock system 114 and/or SBT system 115, and/or between the administrator node 116 the lock system 114 and/or SBT system 115, can be by any suitable method. Communication can be facilitated by wired and/or wireless methods including, but not limited to, employing a cellular network, a wide area network (WAN) (e.g., the Internet), and/or a local area network (LAN). Suitable wired or wireless technologies for facilitating the communications can include, without being limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (Ipv6 over Low power Wireless Area Networks), Z-Wave, an ANT, an ultra-wideband (UWB) standard protocol and/or other proprietary and/or non-proprietary communication protocols.

Discussion first turns to the processor 207, memory 209 and bus 205 of the multi-node system 100.

In one or more embodiments, the multi-node system 100 can comprise a processor 207 (e.g., computer processing unit, microprocessor, classical processor and/or like processor). In one or more embodiments, a component associated with multi-node system 100, as described herein with or without reference to the one or more figures of the one or more embodiments, can comprise one or more computer and/or machine readable, writable and/or executable components and/or instructions that can be executed by processor 207 to facilitate performance of one or more processes defined by such component(s) and/or instruction(s).

In one or more embodiments, the multi-node system 100 can comprise a machine-readable memory 209 that can be operably connected to the processor 207. The memory 209 can store computer-executable instructions that, upon execution by the processor 207, can cause the processor 207 and/or one or more other components of the multi-node system 100 to perform one or more actions. In one or more embodiments, the memory 209 can store computer-executable components.

The multi-node system 100 and/or a component thereof as described herein, can be communicatively, electrically, operatively, optically and/or otherwise coupled to one another via a bus 205 to perform functions of non-limiting system architecture 200, multi-node system 100 and/or one or more components thereof and/or coupled therewith. Bus 205 can comprise one or more of a memory bus, memory controller, peripheral bus, external bus, local bus and/or another type of bus that can employ one or more bus architectures. One or more of these examples of bus 205 can be employed to implement one or more embodiments described herein.

In one or more embodiments, multi-node system 100 can be coupled (e.g., communicatively, electrically, operatively, optically and/or like function) to one or more external systems (e.g., a system management application), sources and/or devices (e.g., classical communication devices and/or like devices), such as via a network. In one or more embodiments, one or more of the components of the multi-node system 100 can reside in the cloud, and/or can reside locally in a local computing environment (e.g., at a specified location(s)).

In addition to the processor 207 and/or memory 209 described above, multi-node system 100 can comprise one or more computer and/or machine readable, writable and/or executable components and/or instructions that, when executed by processor 207, can facilitate performance of one or more operations defined by such component(s) and/or instruction(s).

Turning now again to FIG. 2, an administrator node 116 can configure or request configuration of a lock domain 230 that will be used by the administrator node 116 to communicate changes to the SBT system 115. For example, changes to the SBT system 115 can comprise change to, such as incrementing, a SBT generation number.

Use of the lock domain 230 for this SBT purpose(s) can be communicated to the nodes 110 of the multi-node system 100 by any suitable means, such as by the administrator node 116, processor 207 and/or any other suitable component issuing and/or otherwise generating an initial notification 242. As such, the nodes 110 can be configured to recognize that notifications relative to the lock domain 230 can indicate a possible change to the SBT system 115.

Figure 3:
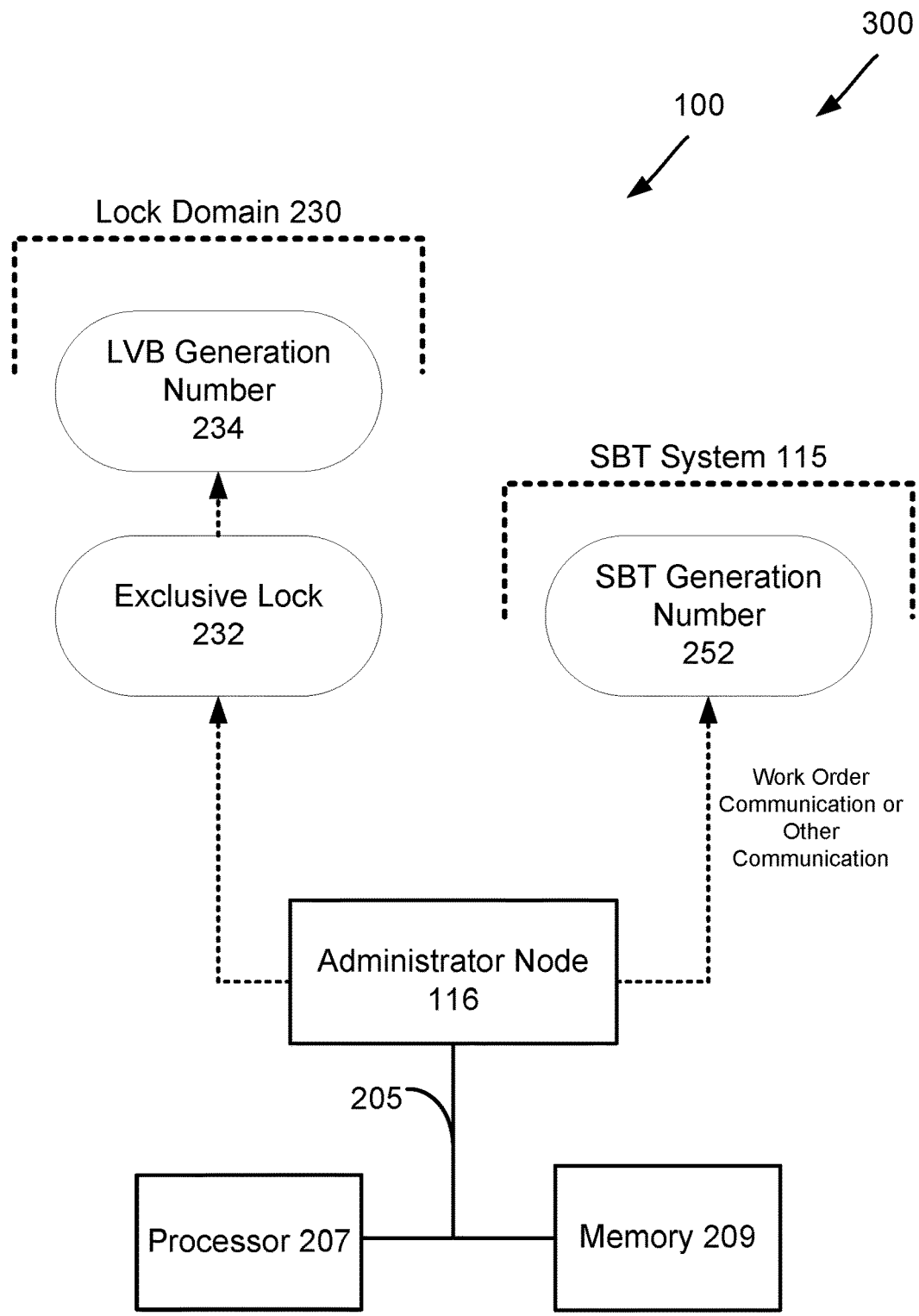
FIG. 3 illustrates yet another block diagram of a node system employing lock domain and a system B-Tree system, in accordance with one or more embodiments and/or implementations described herein.

Turning next to FIG. 3, the administrator node 116 can make a change and/or update to the SBT system 115, such as updating and/or otherwise incrementing an SBT generation number 252 associated with the SBT system 115. To communicate the change to the SBT system 115 that was made by the administrator node 116 (and/or by another node), the administrator node 116 can generally request and the lock system 114 can implement an exclusive lock 232 for the administrator node 116 in the lock domain 230. In this way, the administrator node 116 can update, such as increment an LVB generation number 234. The LVB generation number 234 can be identical to the updated SBT generation number 252 and/or otherwise have a correspondence to the SBT generation number 252. In this way, a node 110 reading the LVB generation number 234 can recognize, utilize and/or otherwise be informed, based on the LVB generation number 234, that a change to a particular SBT generation number 252, and/or more generally, a change to the SBT system, has been implemented.

For example, the LVB generation number 234 read by the node 110 can be compared to an LVB generation number previously cached by the node 110. The LVB generation number 234 read further can be compared to an SBT generation number 252 that has been previously cached by the node 110. Where changes are indicated, such as where the LVB generation numbers do not match, or where the LVB generation number and the SBT generation number 252 do not match and/or otherwise correspond, the node 110 can be triggered to access the SBT system 115.

Figure 4:
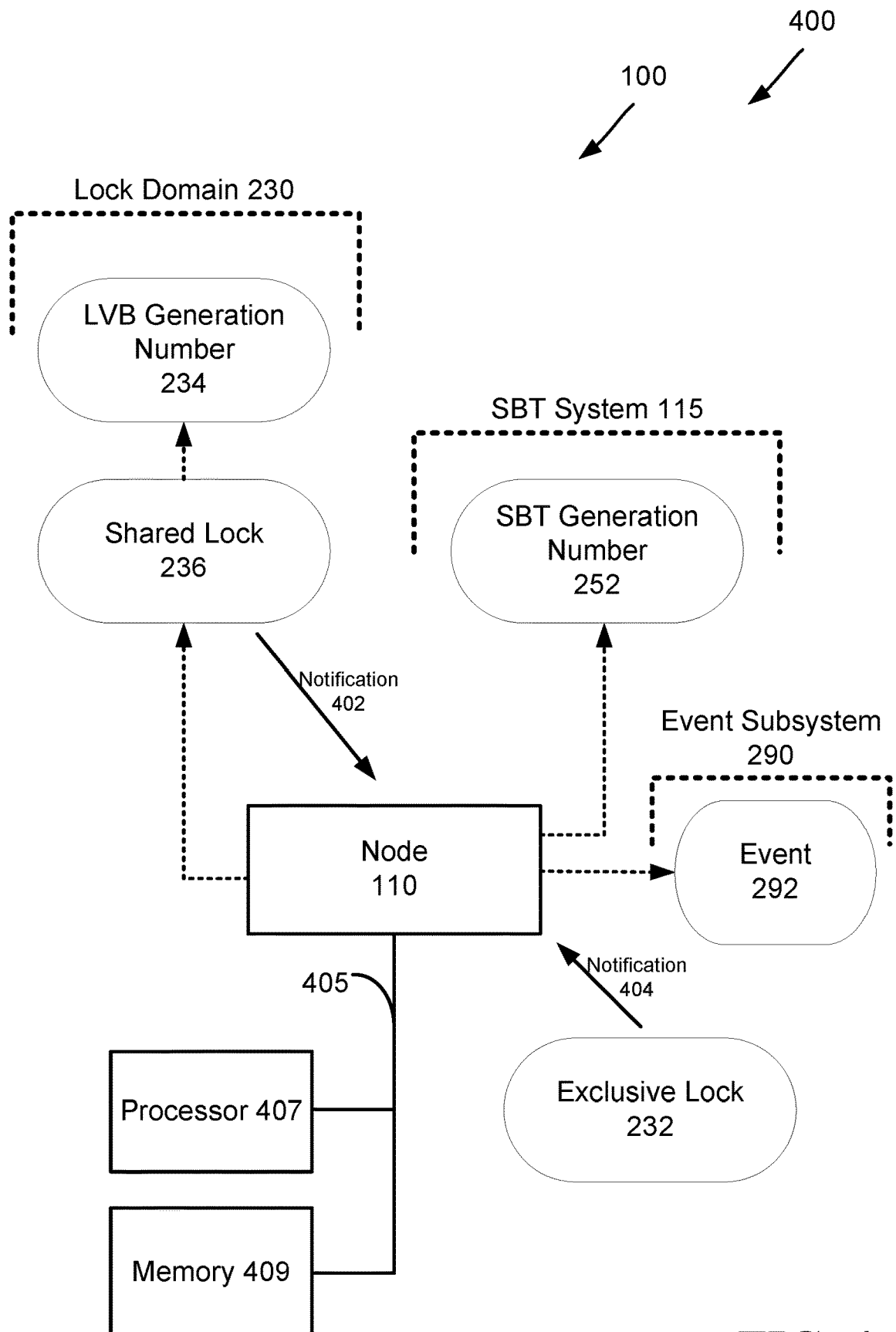
FIG. 4 illustrates still another block diagram of a node system employing lock domain and a system B-Tree system, in accordance with one or more embodiments and/or implementations described herein.

Turning now to FIG. 4, in addition still to FIG. 3, in response to implementation of the exclusive lock 232 for the administrator node 116, any other node (e.g., nodes 110) having a shared lock in the lock domain 230 (e.g., hard shared lock and/or lazily-held shared lock) will be requested to release the shared lock and/or the shared lock will be released automatically. That is, a lock loss callback will be initiated. In response to this lock loss callback, and/or in response to the exclusive lock being implemented and/or requested, a notification (e.g., notification 404 of FIG. 4) can be generated comprising an indication of a known change and/or possible change to the SBT system 115. That is, a change to a lock in the lock domain 230 can cause generation of the notification. The notification can act as a trigger to access the SBT system 115.

The notification 404 can indicate a possible change where an SBT system 115 has not yet been updated and will be at least partially updated corresponding to access to the lock domain 130 by the administrator node 116. The notification 404 can indicate a known change where the SBT system 115 has already been updated at least partially prior to and/or during access to the lock domain 230 by the administrator node. That is, any of the notification generation, SBT generation number incrementation and/or LVB generation number incrementation can take place in different orders and/or at least partially at a same time as one another.

In response to receipt of the notification, and/or in response to requesting and/or receiving implementation of a shared lock 236 in the lock domain 230 for any other purpose, the node 110 can receive the notification 404 as the notification 402. That is, even if the node 110 does not receive the notification 402, access to the lock domain 230, such as by requesting and/or receiving a shared lock 236 can differently allow the node 110 to receive indication of a known or possible change to the SBT system 115 (e.g., by the notification 402).

In one or more embodiments, a notification (e.g., notification 242, 402 and/or 404) can be comprised by and/or be an event, such as of an event subsystem (e.g., event subsystem 290) coupled to and/or comprised by the multi-node system 100. That is, the lock system 114 can employ the event subsystem 290, in one or more embodiments, to generate and/or otherwise broadcast the notifications (e.g., events) to specified users (e.g., nodes).

To determine whether the SBT system 115 should be accessed, the node 110 can read the LVB generation number 234 at the lock domain 230, upon receipt of the shared lock 236. In one or more embodiments, this shared lock 236 can be flashed for a quick read of the LVB generation number 234. That is, the shared lock 236 can be released shortly after its implementation. As indicated above, the LVB generation number 234 and one or more LVB generation numbers and/or SBT generation numbers cached by the node 110 can be compared.

Where comparison is successful, such as where the generation numbers match and/or otherwise correspond, a steady state can be maintained by the node 110. That is, polling of the SBT system 115 can be put off, and/or not performed.

Where comparison is not successful, such as where the generation numbers compared do not match and/or otherwise do not correspond, such can act as a trigger to the node 110 (e.g., the node 110 can be triggered) to access the SBT system 115 and to determine an update thereto. For example, the node 110 can access the SBT system 115 and read one or more SBT generation numbers 252 at the SBT system 115.

In one or more embodiments, where one node 110 is triggered that an SBT generation number is outdated, that node 110 can trigger and/or otherwise request a notification to one or more other nodes 110 that the SBT generation number is outdated. For example, the one node 110 can request and/or otherwise cause issuance of an event 292 by an event subsystem 290. The event 292 can be broadcast to a specified set of nodes, such as a set of nodes that employ the lock domain 230.

Still looking to FIG. 4, it will be appreciated that the node 110 can have coupled thereto a processor 407 and memory 409 by a bus 405. Description above of the processor 207, memory 209 and bus 205 apply respectively to the processor 407, memory 409 and bus 405. Additionally and/or alternatively, the node 110 can be coupled to the processor 207, memory 209 and/or bus 205.

Referring to FIGS. 1-4 in combination, it is appreciated that any one or more of the processes aforedescribed can be performed at scale. For example, any one or more nodes 110 can at least partially at the same time have a shared lock implemented in the lock domain 230. In an example, more than one SBT update can be communicated at least partially at the same time by the administrator node 116, such as by a same exclusive lock and/or subsequent exclusive locks.

Figure 5:
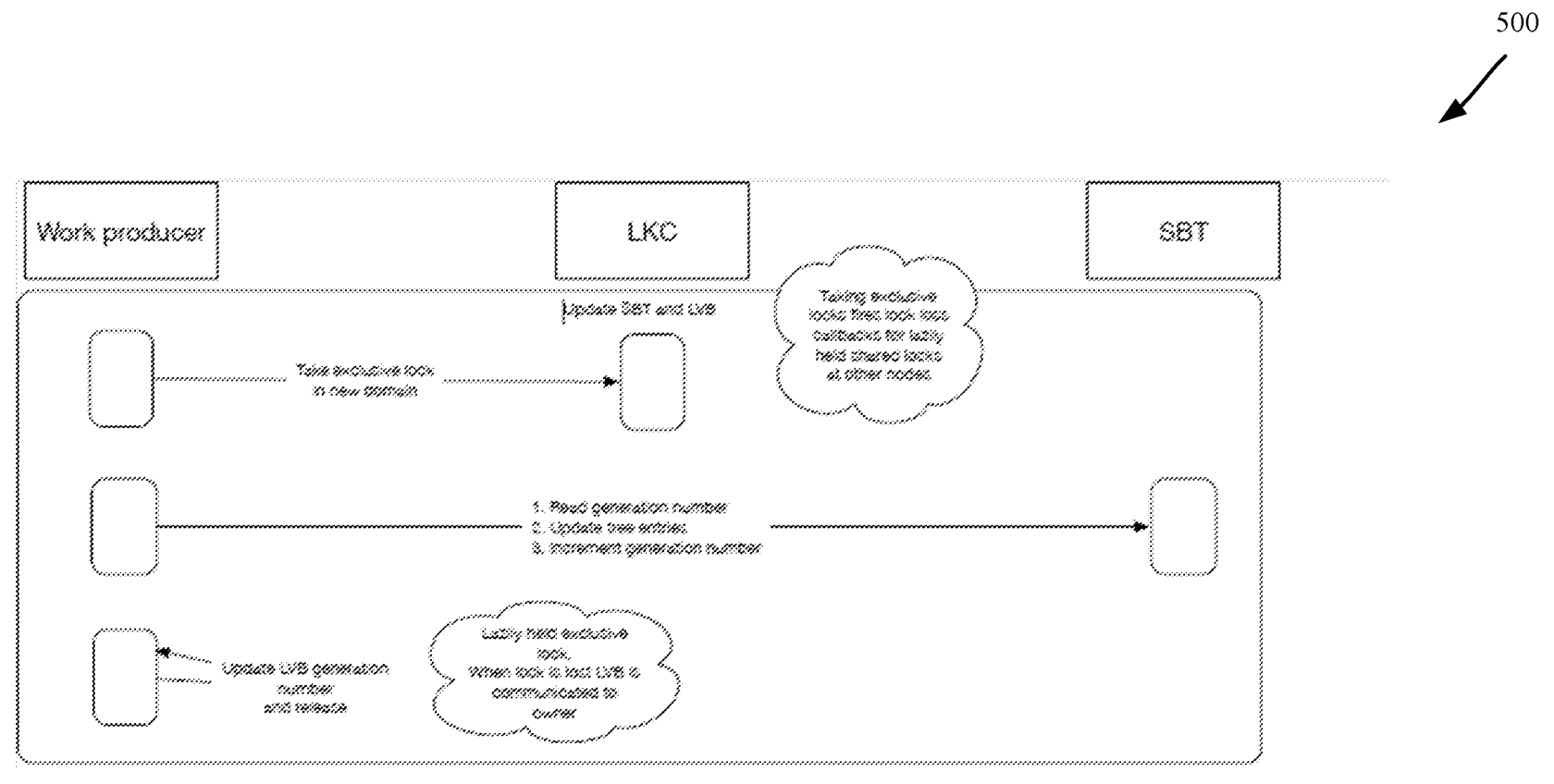
Figure 6:
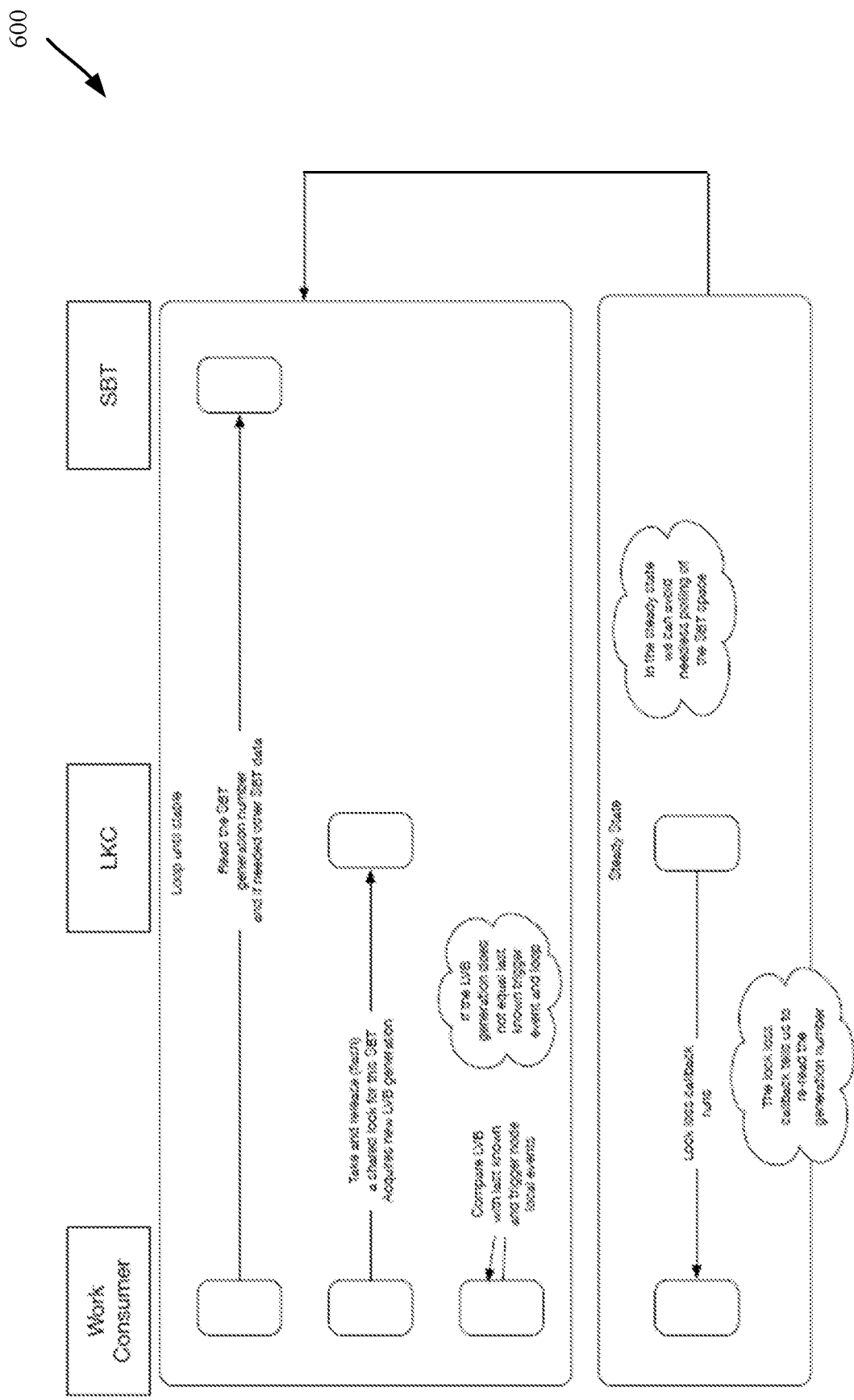
FIG. 6 illustrates another process flow diagram of one or more processes performed by the node system of any one or more of FIGS. 1-4, in accordance with one or more embodiments and/or implementations described herein.

Turning now to FIGS. 5 and 6, further illustration of use of a lock system to communicate changes to an SBT system are differently illustrated, for further understanding.

As illustrated at FIG. 5, a service (e.g., administrator node 116) that is instructed to and/or is otherwise to update an SBT can perform one or more operations comprising taking an exclusive lock in the new lock domain for this SBT, reading the existing SBT's generation value, updating the SBT space as needed, incrementing the SBT generation number, updating the LVB version of the generation number to match the SBT generation number value, and releasing the exclusive lock.

A service (e.g., node 110) that is instructed to and/or is otherwise to consume an SBT can perform one or more operation comprising reading the SBT's generation number key and possibly other SBT data to establish a baseline, caching the generation number, and taking and then immediately release a shared lock (flashed lock) for the SBT to get the LVB version of the generation number. If the cached SBT generation number and the read LVB generation number, an event, such as an event can be raised, indicating outdating of the cached SBT generation number. This can thus trigger node-local threads to re-read the SBT space. Otherwise the node can remain in a steady-state until the flashed lock is lost (lock loss callback fires).

That is, via the above, cluster state and/or configuration changes to an SBT, such as to a collection of read-only consumers (e.g., nodes 110), can be facilitated.

Example Operations

Figure 7:
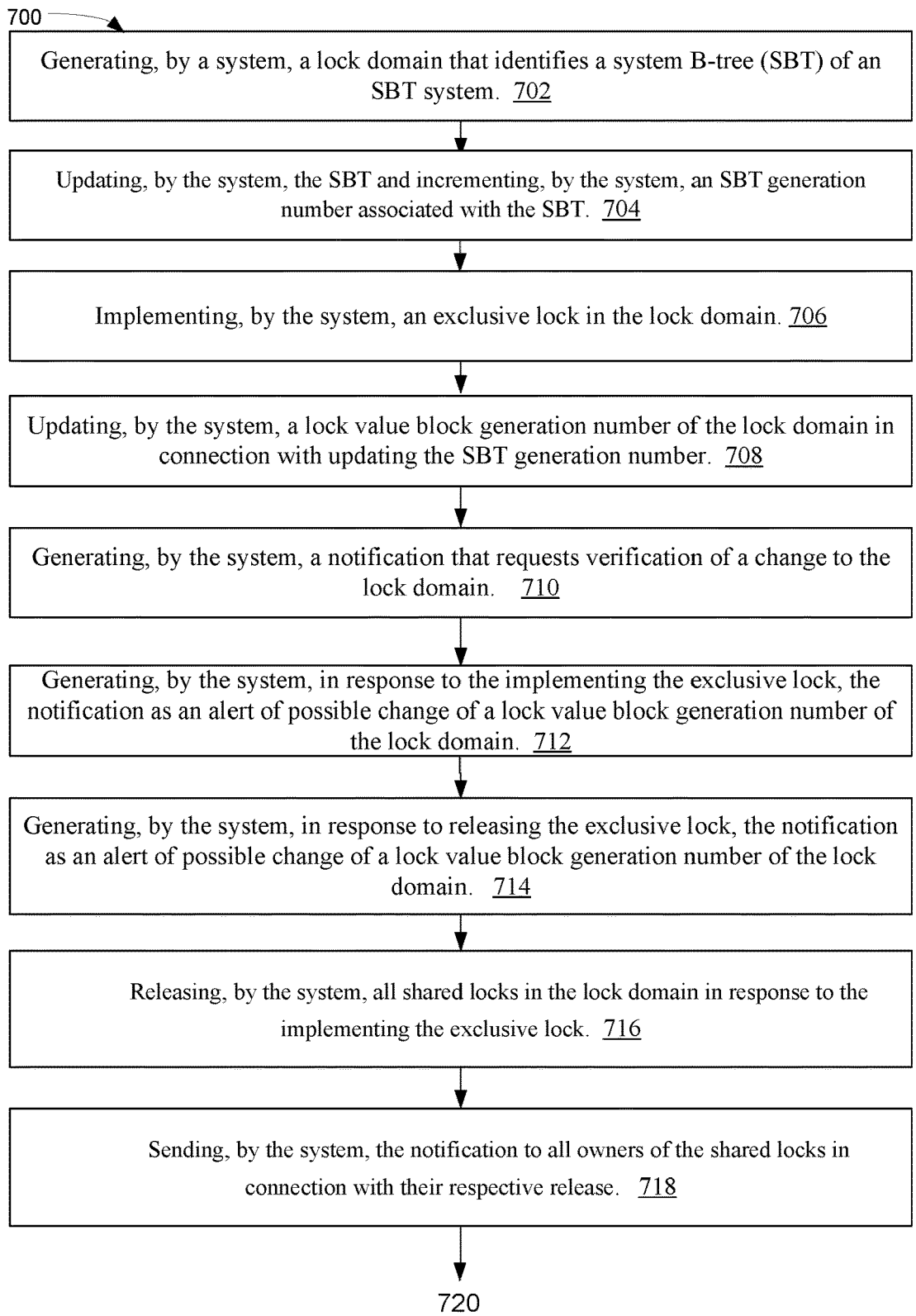
FIG. 7 illustrates a process flow diagram of a method of communicating a change regarding an SBT system using a lock system, in accordance with one or more embodiments and/or implementations described herein.
Figure 8:
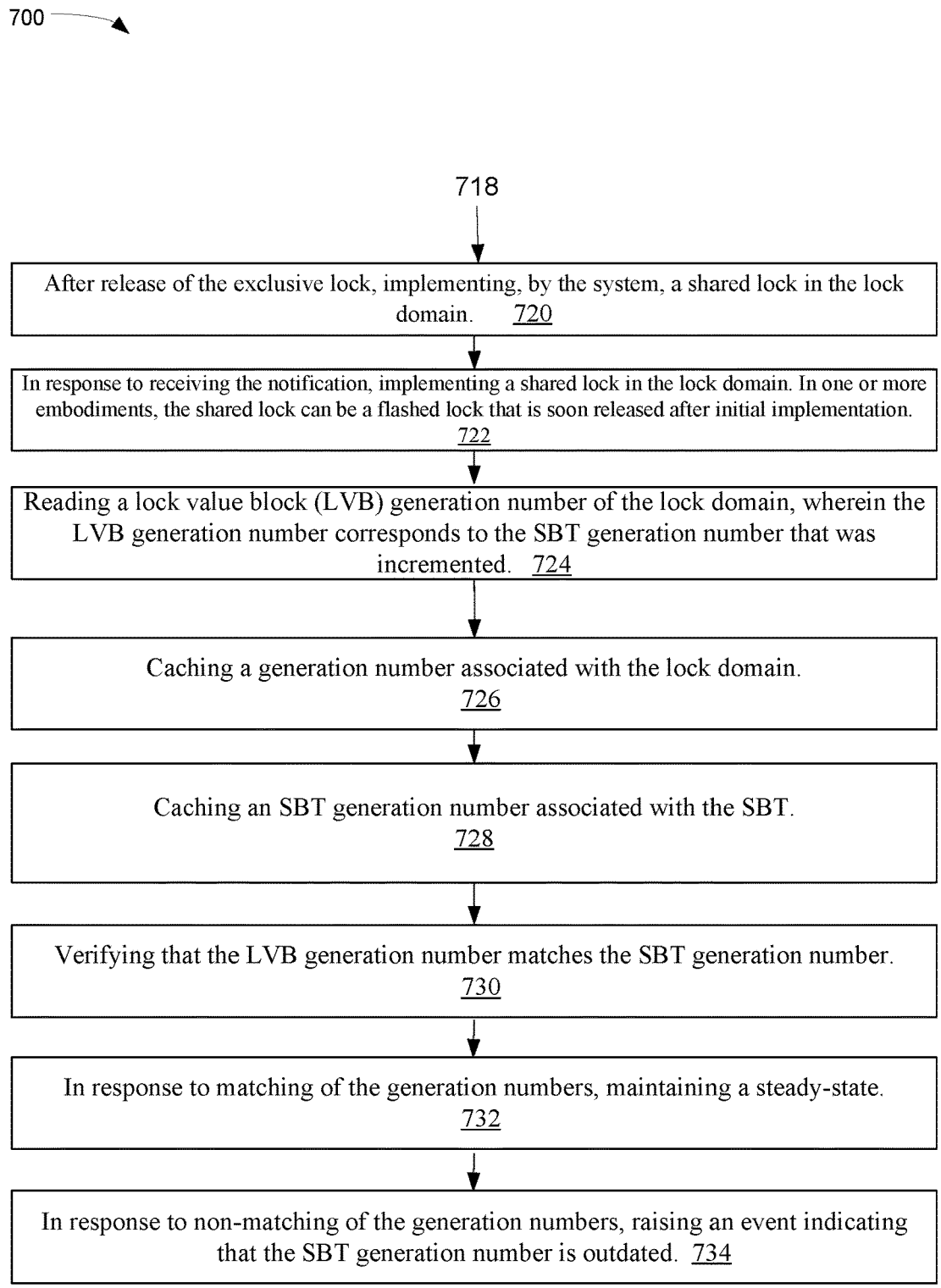
FIG. 8 illustrates a continuation of the process flow diagram of FIG. 7 of a method of communicating a change regarding an SBT system using a lock system, in accordance with one or more embodiments and/or implementations described herein.

Turning now to FIGS. 7 and 8, a process flow comprising a set of operations for broadcasting a notification for an SBT system by using a lock system is illustrated relative to FIGS. 1-6. One or more elements, objects and/or components referenced in the process flow 700 can be those of schematics 100-600. Repetitive description of like elements and/or processes employed in respective embodiments is omitted for sake of brevity.

At operation 702, the process flow 700 can comprise generating, by a system, a lock domain that identifies a system B-tree (SBT) of an SBT system.

At operation 704, the process flow 700 can comprise updating, by the system, the SBT and incrementing, by the system, an SBT generation number associated with the SBT. That is, the administrator node (e.g., administrator node 116) can send a communication by the incrementation of the SBT generation number. The communication can be a work order, for example.

At operation 706, the process flow 700 can comprise implementing, by the system, an exclusive lock in the lock domain.

At operation 708, the process flow 700 can comprise updating, by the system, a lock value block generation number of the lock domain in connection with updating the SBT generation number.

At operation 710, the process flow 700 can comprise generating, by the system, a notification that requests verification of a change to the lock domain.

At operation 712, the process flow 700 can comprise generating, by the system, in response to the implementing the exclusive lock, the notification as an alert of possible change of a lock value block generation number of the lock domain.

At operation 714, the process flow 700 can comprise generating, by the system, in response to releasing the exclusive lock, the notification as an alert of possible change of a lock value block generation number of the lock domain.

At operation 716, the process flow 700 can comprise releasing, by the system, all shared locks in the lock domain in response to the implementing the exclusive lock.

At operation 718, the process flow 700 can comprise sending, by the system, the notification to all owners of the shared locks in connection with their respective release.

At operation 720, the process flow 700 can comprise, after release of the exclusive lock, implementing, by the system, a shared lock in the lock domain.

At operation 722, the process flow 700 can comprise, in response to receiving the notification, implementing a shared lock in the lock domain. In one or more embodiments, the shared lock can be a flashed lock that is soon released after initial implementation.

At operation 724, the process flow 700 can comprise reading a lock value block (LVB) generation number of the lock domain, wherein the LVB generation number corresponds to the SBT generation number that was incremented.

At operation 726, the process flow 700 can comprise caching a generation number associated with the lock domain.

At operation 728, the process flow 700 can comprise caching an SBT generation number associated with the SBT.

At operation 730, the process flow 700 can comprise verifying that the LVB generation number matches the SBT generation number.

At operation 732, the process flow 700 can comprise, in response to matching of the generation numbers, maintaining a steady-state.

At operation 734, the process flow 700 can comprise, in response to non-matching of the generation numbers, raising an event indicating that the SBT generation number is outdated.

For simplicity of explanation, the computer-implemented methodologies and/or processes provided herein are depicted and/or described as a series of acts. The subject innovation is not limited by the acts illustrated and/or by the order of acts, for example acts can occur in one or more orders and/or concurrently, and with other acts not presented and described herein. The operations of process flows of the FIGS. provided herein are example operations, and there can be one or more embodiments that implement more or fewer operations than are depicted.

Furthermore, not all illustrated acts can be utilized to implement the computer-implemented methodologies in accordance with the described subject matter. In addition, the computer-implemented methodologies could alternatively be represented as a series of interrelated states via a state diagram or events. Additionally, the computer-implemented methodologies described hereinafter and throughout this specification are capable of being stored on an article of manufacture to facilitate transporting and transferring the computer-implemented methodologies to computers. The term article of manufacture, as used herein, is intended to encompass a computer program accessible from any machine-readable device or storage media.

In summary, described herein is related to communication by a system B-Tree system using a lock system. An example method can comprise implementing, by a system comprising a processor, an exclusive lock in a lock domain that identifies a system B-tree (SBT) of an SBT system, updating, by the system, the SBT and incrementing, by the system, an SBT generation number associated with the SBT, and generating, by the system, a notification that requests verification of a change to the lock domain. Another example method can comprise applying a lock in a lock domain associated with a system B-Tree (SBT) of an SBT system, caching generation numbers associated with the lock domain, and verifying the generation numbers relative to one another to determine whether the generation numbers match one another.

As a result, a method is provided for efficient communication of an administrator node with sub-nodes, such as a work distribution node with worker nodes. For example, as compared to conventional frameworks, the framework(s) discussed herein can employ less disc IO, less memory, less processing power and/or the like to communicate regarding changes to an SBT system. Continuous polling of the SBT system, and/or of SBT space associated therewith, is not performed by the sub-nodes. Rather, the sub-nodes can rely on a steady state of the SBT space until receipt of a notification of a possible change to the SBT space. As noted above, such notification can be due to an a change relative to a lock of the lock domain that the administrator node and sub-nodes recognize as being used for SBT space communication. That change relative to a lock can comprise implementation of an exclusive lock, release of an exclusive lock, automatic release of a shared lock and/or implementation of a shared lock.

Indeed, the one or more embodiments described herein can provide automatic indication of SBT generation number change via use of the notifications generating from the lock system. And thus, as indicated above, polling at a frequency by the sub-nodes is not employed, or can be employed at a low frequency.

The systems and/or devices have been (and/or will be further) described herein with respect to interaction between one or more components. Such systems and/or components can include those components or sub-components specified therein, one or more of the specified components and/or sub-components, and/or additional components. Sub-components can be implemented as components communicatively coupled to other components rather than included within parent components. One or more components and/or sub-components can be combined into a single component providing aggregate functionality. The components can interact with one or more other components not specifically described herein for the sake of brevity, but known by those of skill in the art.

One or more embodiments described herein are inherently and/or inextricably tied to computer technology and cannot be implemented outside of a computing environment. For example, one or more processes performed by one or more embodiments described herein can more efficiently, and even more feasibly, provide program and/or program instruction execution as compared to existing systems and/or techniques. Systems, computer-implemented methods and/or computer program products facilitating performance of these processes are of great utility in the fields of node-to-node communication, work distribution and/or the like, and cannot be equally practicably implemented in a sensible way outside of a computing environment.

One or more embodiments described herein can employ hardware and/or software to solve problems that are highly technical, that are not abstract, and that cannot be performed as a set of mental acts by a human. For example, a human, or even thousands of humans, cannot efficiently, accurately and/or effectively implement and/or release locks of a lock domain corresponding to one or more changes to a system B-tree system as the one or more embodiments described herein can facilitate these processes. And, neither can the human mind nor a human with pen and paper automatically perform one or more of the processes as conducted by one or more embodiments described herein.

In one or more embodiments, one or more of the processes described herein can be performed by one or more specialized computers (e.g., a specialized processing unit, a specialized classical computer, and/or another type of specialized computer) to execute defined tasks related to the one or more technologies describe above. One or more embodiments described herein and/or components thereof can be employed to solve new problems that arise through advancements in technologies mentioned above, employment of cloud computing systems, computer architecture and/or another technology.

One or more embodiments described herein can be fully operational towards performing one or more other functions (e.g., fully powered on, fully executed and/or another function) while also performing the one or more operations described herein.

Example Operating Environment

Figure 9:
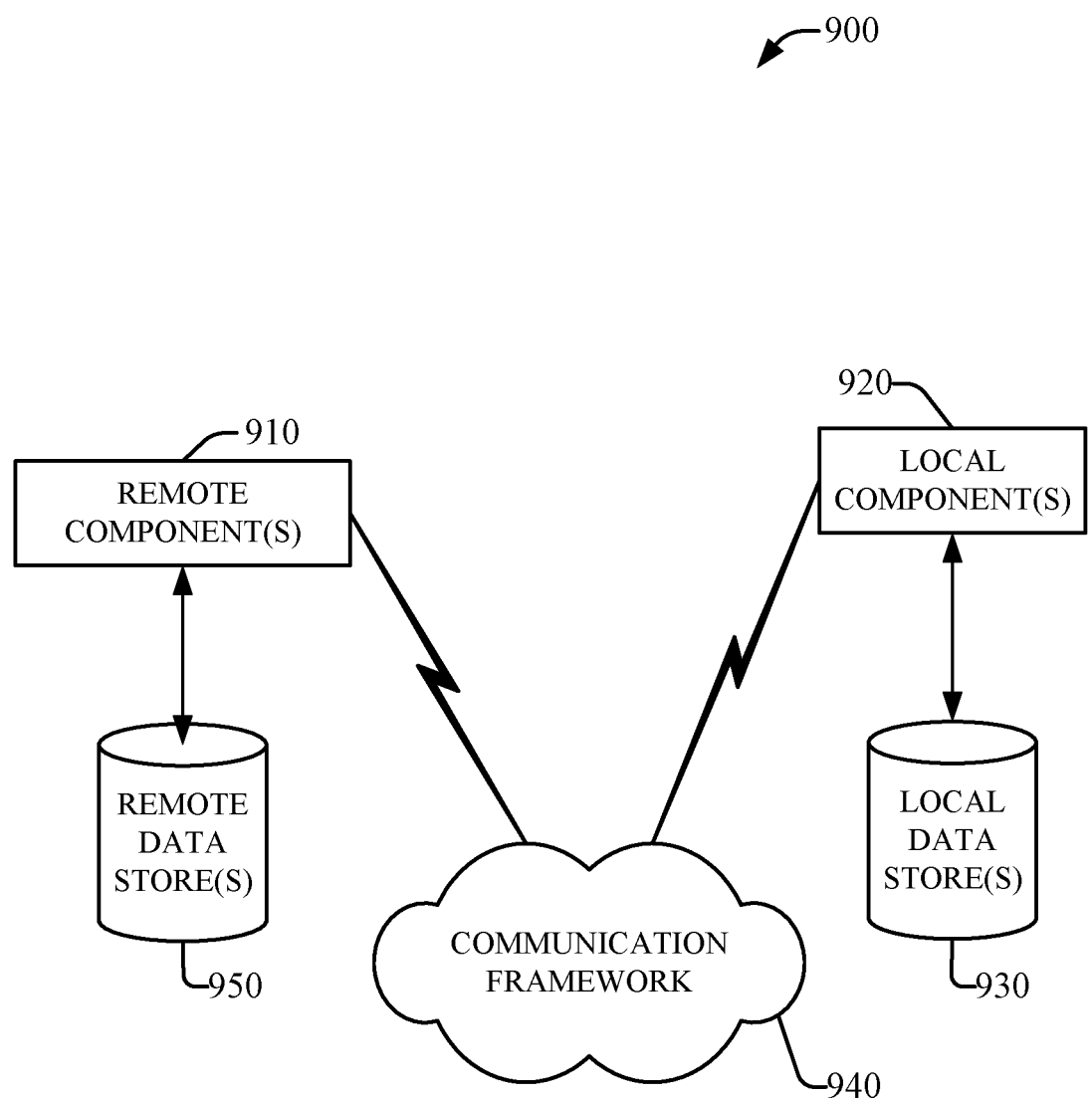
FIG. 9 illustrates a block diagram of an example operating environment into which embodiments of the subject matter described herein can be incorporated.

FIG. 9 is a schematic block diagram of an operating environment 900 with which the described subject matter can interact. The operating environment 900 comprises one or more remote component(s) 910. The remote component(s) 910 can be hardware and/or software (e.g., threads, processes, computing devices). In one or more embodiments, remote component(s) 910 can be a distributed computer system, connected to a local automatic scaling component and/or programs that use the resources of a distributed computer system, via communication framework 940. Communication framework 940 can comprise wired network devices, wireless network devices, mobile devices, wearable devices, radio access network devices, gateway devices, femtocell devices, servers, etc.

The operating environment 900 also comprises one or more local component(s) 920. The local component(s) 920 can be hardware and/or software (e.g., threads, processes, computing devices). In one or more embodiments, local component(s) 920 can comprise an automatic scaling component and/or programs that communicate/use the remote resources 910 and 920, etc., connected to a remotely located distributed computing system via communication framework 940.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The operating environment 900 comprises a communication framework 940 that can be employed to facilitate communications between the remote component(s) 910 and the local component(s) 920, and can comprise an air interface, e.g., interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940.

Example Computing Environment

Figure 10:
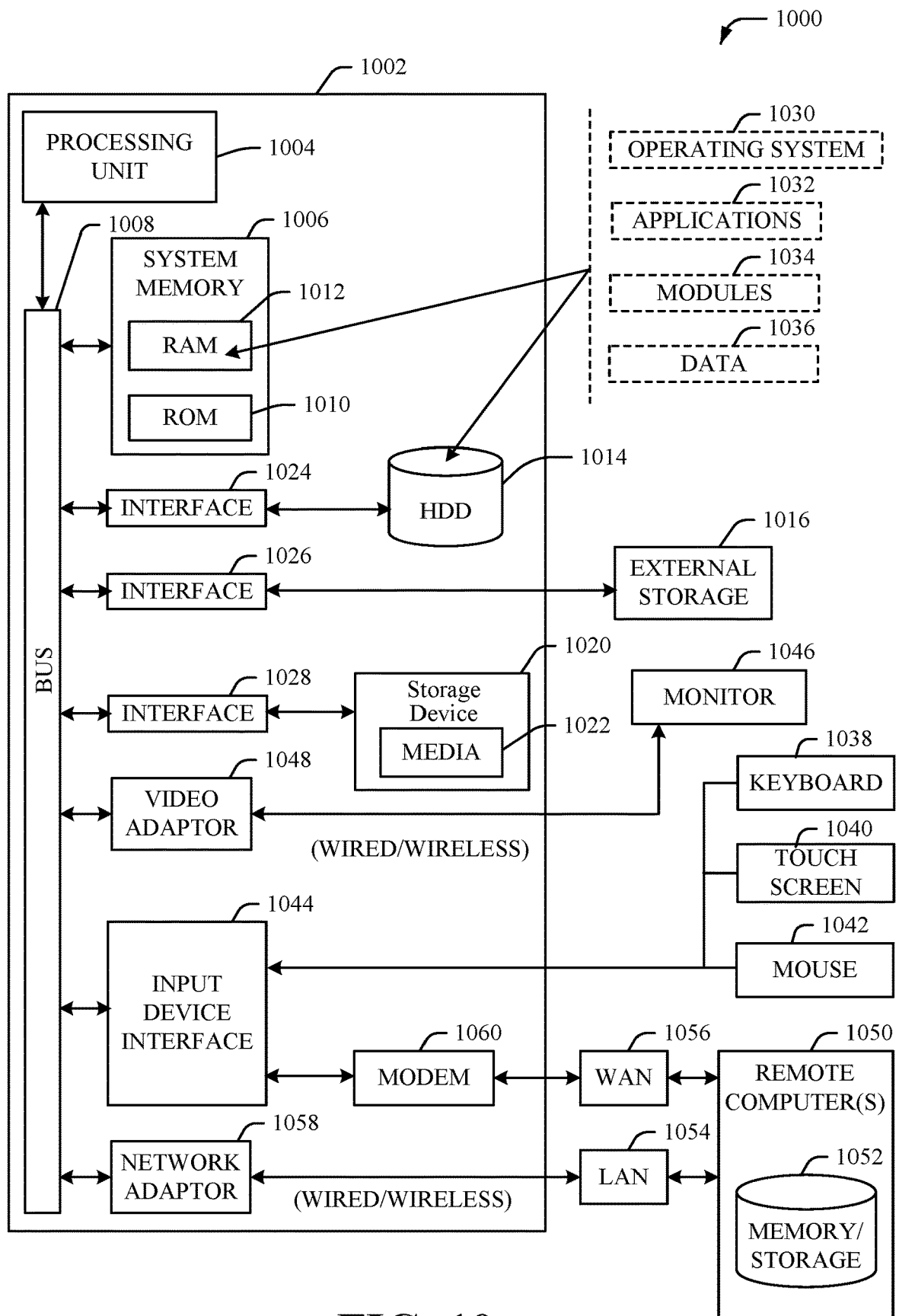
FIG. 10 illustrates an example schematic block diagram of a computing environment with which the subject matter described herein can interact and/or be implemented at least in part, in accordance with one or more embodiments and/or implementations described herein.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

Referring still to FIG. 10, the example computing environment 1000 which can implement one or more embodiments described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), and can include one or more external storage devices 1016 (e.g., a magnetic floppy disk drive (FDD) 1016, a memory stick or flash drive reader, a memory card reader, etc.). While the internal HDD 1014 is illustrated as located within the computer 1002, the internal HDD 1014 can also be configured for external use in a suitable chassis (not shown). Additionally, while not shown in computing environment 1000, a solid state drive (SSD) could be used in addition to, or in place of, an HDD 1014.

Other internal or external storage can include at least one other storage device 1020 with storage media 1022 (e.g., a solid state storage device, a nonvolatile memory device, and/or an optical disk drive that can read or write from removable media such as a CD-ROM disc, a DVD, a BD, etc.). The external storage 1016 can be facilitated by a network virtual machine. The HDD 1014, external storage device(s) 1016 and storage device (e.g., drive) 1020 can be connected to the system bus 1008 by an HDD interface 1024, an external storage interface 1026 and a drive interface 1028, respectively.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. The network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

The above description of illustrated embodiments of the one or more embodiments described herein, comprising what is described in the Abstract, is not intended to be exhaustive or to limit the described embodiments to the precise forms described. While one or more specific embodiments and examples are described herein for illustrative purposes, various modifications are possible that are considered within the scope of such embodiments and examples, as those skilled in the relevant art can recognize.

In this regard, while the described subject matter has been described in connection with various embodiments and corresponding figures, where applicable, other similar embodiments can be used or modifications and additions can be made to the described embodiments for performing the same, similar, alternative, or substitute function of the described subject matter without deviating therefrom. Therefore, the described subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures to optimize space usage or enhance performance of user equipment. A processor can also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. However, there is no intention to limit the various embodiments to the one or more specific forms described, but on the contrary, the intention is to cover all modifications, alternative constructions, and equivalents falling within the spirit and scope.

In addition to the various implementations described herein, other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A method, comprising:
generating, by a system comprising at least one processor, an exclusive lock, at a computer system, in a lock domain, generated by the computer system,
identifying, by the system, a system B-tree (SBT) of an SBT system in response to accessing the exclusive lock by the system;
updating, by the system, the SBT comprising incrementing an SBT generation number, at the computer system, that is associated with the SBT;
caching, by the system, a lock value block generation number, associated with the lock domain, at the computer system, wherein the cache remains valid as long as the SBT generation number remains unchanged;
updating, by the system, the lock value block generation number in connection with incrementing the SBT generation number; and
generating, by the system, in response to the generating of the exclusive lock, a notification that requests verification of a change to the lock domain, wherein the change corresponds to the updating of the SBT, and wherein the notification comprises an alert of a change of the lock value block generation number.

2. The method of claim 1, further comprising:
releasing, by the system, all shared locks in the lock domain in response to the implementing the exclusive lock; and
sending, by the system, the notification to all owners of the shared locks in connection with their respective release.

3. The method of claim 1, further comprising:
after release of the exclusive lock, implementing, by the system, a shared lock in the lock domain; and
receiving, by the system, the notification in response to the implementing of the shared lock.

4. The method of claim 1, further comprising:
in response to receiving the notification, implementing, by the system, a shared lock in the lock domain and reading, by the system, the lock value block generation number of the lock domain, wherein the lock value block generation number corresponds to the SBT generation number that was incremented.

5. The method of claim 1, further comprising:
generating, by the system, the lock domain; and
sending, by the system, a communication resulting from the incrementing of the SBT generation number and comprising the notification.

6. A system, comprising:
at least one processor, and at least one memory that stores executable instructions that, when executed by the at least one processor, facilitate performance of operations, comprising:
  generating an exclusive lock in the lock domain that identifies a system B-tree (SBT) of an SBT system;
  updating the SBT comprising incrementing an SBT generation number that is associated with the SBT;
  caching a lock value block generation number, associated with a lock domain, wherein the cache remains valid as long as the SBT generation number remains unchanged;
  updating the lock value block generation number in connection with incrementing the SBT generation number; and
  generating, in response to the generating of the exclusive lock, a notification that requests verification of a change to the lock domain, wherein the change corresponds to the updating of the SBT, and wherein the notification comprises an alert of a change of the lock value block generation number.

7. The system of claim 6, wherein the operations further comprise:
broadcasting the notification to the lock domain.

8. The system of claim 7, wherein the broadcasting is performed in response to change of status of a lock in the lock domain, the lock comprising the exclusive lock or another lock.

9. The system of claim 8, wherein the change of status of the lock in the lock domain comprises at least one of releasing the exclusive lock in the lock domain or implementing a shared lock in the lock domain.

10. The system of claim 6, wherein the operations further comprise:
requesting release of any shared locks in the lock domain in response to implementation of the exclusive lock in the lock domain.

11. The system of claim 6, wherein the operations further comprise:
generating the lock domain for the SBT system.

12. The system of claim 6, wherein the operations further comprise:
releasing a shared lock in the lock domain after obtaining the lock value block generation number of a lock value block corresponding to the SBT system.

13. The system of claim 6, wherein the operations further comprise:
obtaining the notification; and
verifying the SBT generation number of the SBT system relative to the lock value block generation number corresponding to the SBT system.

14. The system of claim 13, wherein the operations further comprise:
determining that the lock value block generation number does not match the SBT generation number; and
raising an event indicating that the SBT generation number is outdated.

15. A non-transitory machine-readable medium, comprising executable instructions that, when executed by at least one processor facilitate performance of operations, comprise:
  generating an exclusive lock in a lock domain that identifies a system B-tree (SBT) of an SBT system;
  updating the SBT comprising incrementing an SBT generation number that is associated with the SBT;
  caching a lock value block generation number, associated with a lock domain, wherein the cache remains valid as long as the SBT generation number remains unchanged;
  updating the lock value block generation number in connection with incrementing the SBT generation number; and
  generating, in response to the generating of the exclusive lock, a notification that requests verification of a change to the lock domain, wherein the change corresponds to the updating of the SBT, and wherein the notification comprises an alert of a change of the lock value block generation number.

16. The non-transitory machine-readable medium of claim 15, wherein the operations further comprise:
broadcasting the notification to the lock domain.

17. The non-transitory machine-readable medium of claim 16, wherein the operations further comprise:
performing the broadcasting performed in response to change of status of a lock in the lock domain, the lock comprising the exclusive lock or another lock.

18. The non-transitory machine-readable medium of claim 17, wherein the change of status of the lock in the lock domain comprises at least one of releasing the exclusive lock in the lock domain or implementing a shared lock in the lock domain.

19. The non-transitory machine-readable medium of claim 15, wherein the operations further comprise:
requesting release of any shared locks in the lock domain in response to implementation of the exclusive lock in the lock domain.

20. The non-transitory machine-readable medium of claim 15, wherein the operations further comprise:
releasing a shared lock in the lock domain after obtaining the lock value block generation number of a lock value block corresponding to the SBT system.

* * * * *